March 6, 1951     E. T. BARNETT     2,544,061

SPEED CHANGE DRIVING HEAD FOR POWER-DRIVEN MACHINES

Filed Sept. 13, 1948     3 Sheets-Sheet 1

INVENTOR.
Elson Thomas Barnett
BY
Scott L. Norvel
Attorney

March 6, 1951 E. T. BARNETT 2,544,061
SPEED CHANGE DRIVING HEAD FOR POWER-DRIVEN MACHINES
Filed Sept. 13, 1948 3 Sheets-Sheet 2

INVENTOR.
Elson Thomas Barnett,
BY
Scott L. Norvell
Attorney

Patented Mar. 6, 1951

2,544,061

UNITED STATES PATENT OFFICE 2,544,061

SPEED CHANGE DRIVING HEAD FOR POWER-DRIVEN MACHINES

Elson Thomas Barnett, Phoenix, Ariz., assignor to Savage-Barnett Tool Company, Phoenix, Ariz., a corporation of Arizona Application September 13, 1948, Serial No. 48,985

3 Claims. (Cl. 74—785)

This invention relates to speed change driving heads for power driven machines, such as drill presses and the like.

One of the objects of my invention is to provide a drill press with a head having mechanism for varying the speed of the drill spindle contained therein and operative as a unit;

Another object is to provide a drill press having a speed change unit surrounding the spindle, arranged to vary the spindle speed, with reference to that of the driving motor, throughout a wide range, without the necessity of changing belts or shifting pulleys;

Another object is to provide a speed change mechanism for drill presses or other power driven tools which is cheaply and easily constructed, and extremely easy to operate;

Another object is to provide a driving head for power driven machinery having a spindle drive including a combined variable speed pulley and planetary speed change gearing;

A still further object is to provide a speed varying drill press head, as above mentioned, with an oiling system which automatically circulates oil within said head throughout the gearing and wear surfaces therein whenever the gear portion of the mechanism is operated.

Other objects will appear hereinafter.

I attain the foregoing objects by means of the construction and devices shown in the accompanying drawings in which—

Figure 1:
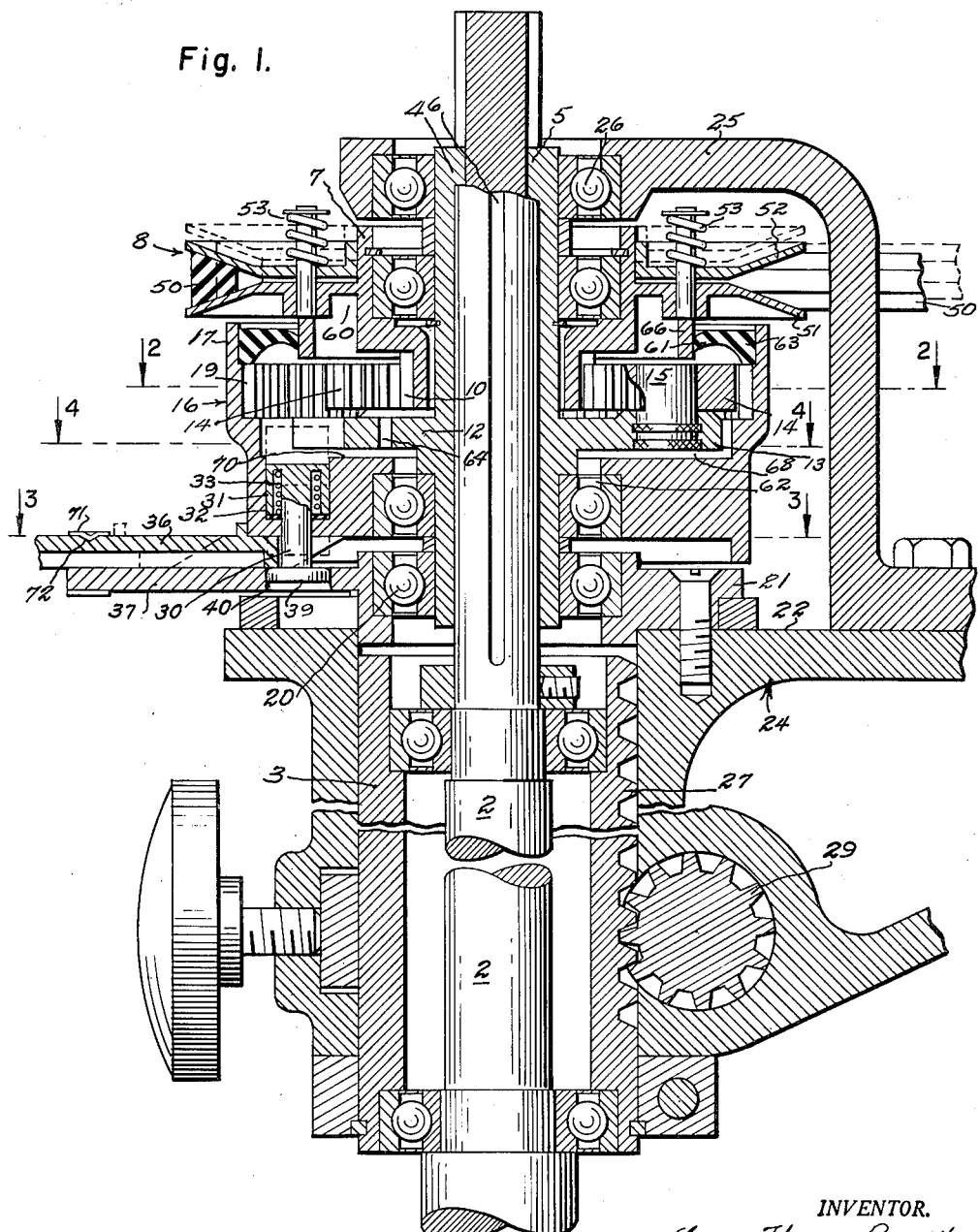
Figure 2:
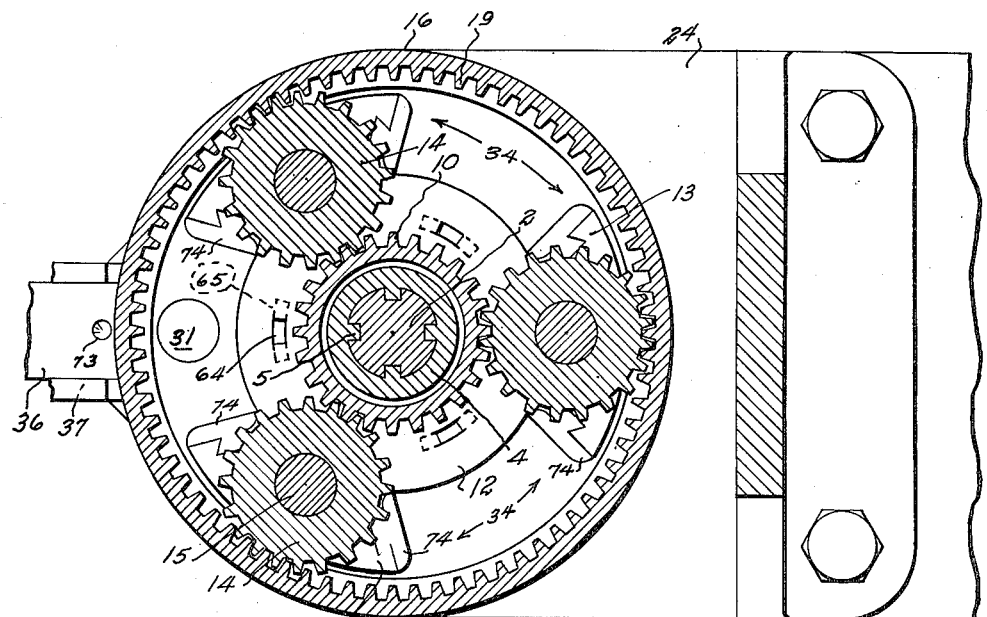
Figure 3:
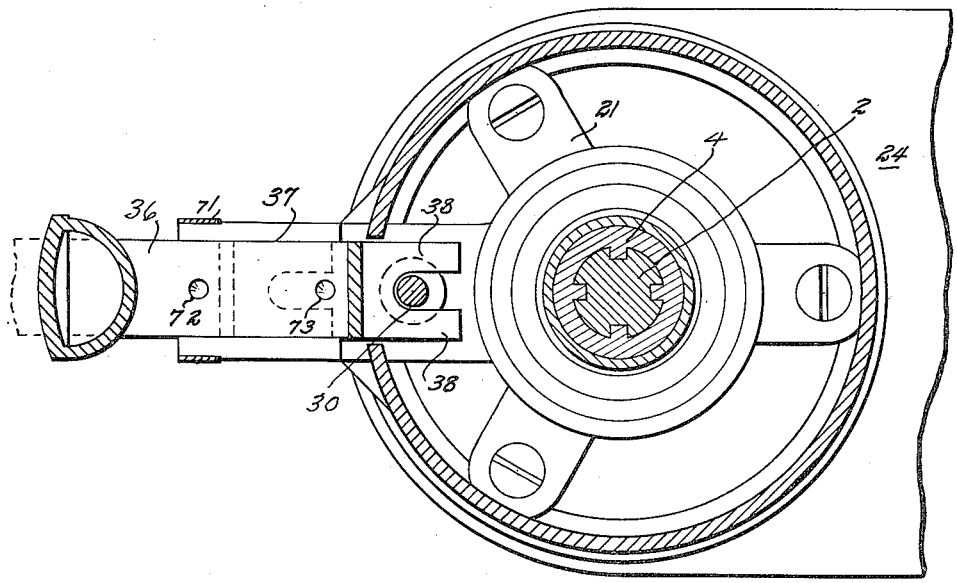
Figure 4:
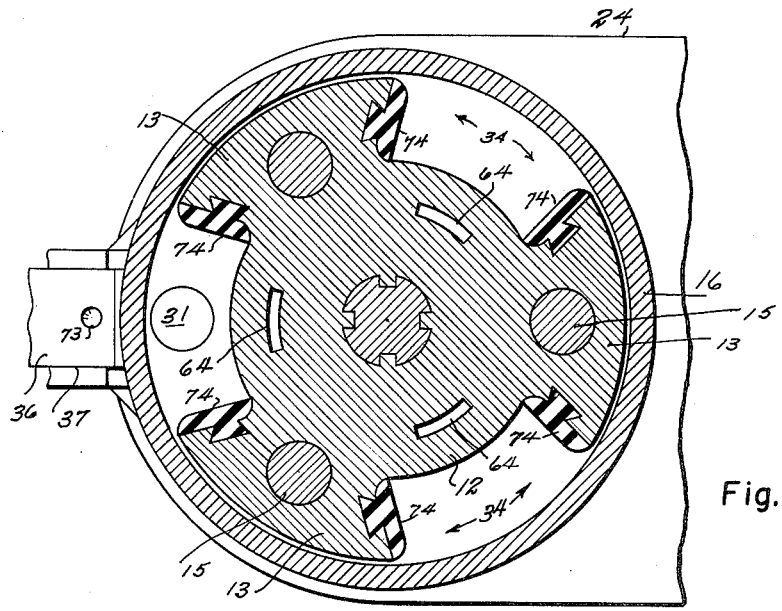
Figure 5:
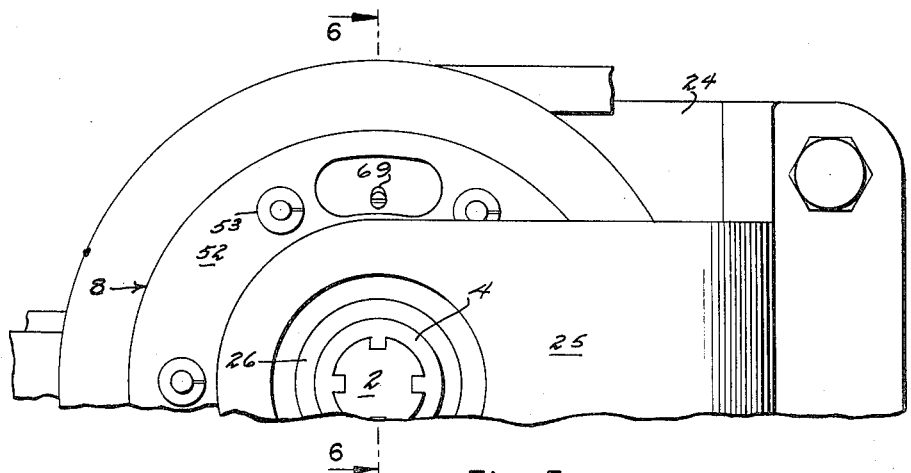

Figure 1 is a midsectional side elevation of a drill press head, incorporating my improvements;

Figure 2, a horizontal sectional view taken substantially on line 2—2, Figure 1;

Figure 3, a horizontal sectional view taken on line 3—3, Figure 1;

Figure 4, a horizontal section taken on line 4—4, Figure 1;

Figure 5, a partial top plan view; and

Figure 6:
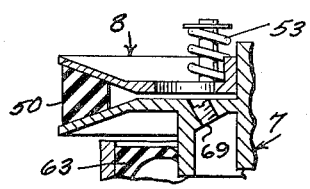

Figure 6, a fragmentary vertical section taken substantially on line 6—6, Figure 5.

Similar numerals refer to similar parts in the several views.

The lower portion of spindle 2 is journalled in quill 3. The upper part of the spindle is slidably operable in a sleeve 4 which has keys 5 adapted to engage in splines 6 formed in the spindle. A driving element 7 is journalled on the upper part of sleeve 4 and has a variable speed V belt pulley 8, formed on its upper part and a sun gear 10 formed on its lower part.

Sleeve 4 has an integrally formed flange 12 extending outward from its middle portion which has radially extending lobes 13 forming supports for the bearing pins 15 of idler planetary gears 14 which mesh with sun gear 10.

A cup-shaped housing 16 is journalled on the lower part of sleeve 4 below flange support 12 and has a rim 17 extending upward. A ring gear 19 is cast within this rim and meshes with idler planetary gears 14.

To stabilize the sleeve 4 it is journalled at its lower end by bearing 20 in a plate 21 which is attached to the upper face 22 of head frame 24, and at its upper end to frame bracket 25 by bearing 26. Quill 3 slides in frame 24 controlled by gear 29 which meshes in rack 27 along the quill.

A locking pin 30 having an undergrooved head 31 at its upper end operates vertically in a radially positioned hole 32 in gear housing 16. It is normally urged upward by a spring 33 set in the undergroove of head 31 whereby it engages in the detaining notches 34 between lobes 13 of sleeve flange 12.

A fork 36 is secured in a channel 37 in head frame plate 21 so that it may be operated in and out radially relative to the spindle axis. The inner end of this fork is slotted to form tines 38 which are beveled on their under faces to engage over the nut or head 39 of pin 30. When moved inwardly these tines engage head 39 on the lower end of locking pin 30 and the beveled faces force this pin downward into recess 40 in plate 21 against the tension of spring 33. In this position the sleeve plate 12 is released and rotates separately from the ring gear housing while the housing 16 is held in fixed position by the nut 39 on the stop pin 30. Rotary motion is then transmitted from the driving element 7 through its sun gear 10 and idler gears 14 to plate 12 and sleeve 4, which turns at reduced speed.

When fork 36 is moved radially outward the pin 30 is released and moves upward under the urge of spring 33, to engage in any one of the notches between the lobes 13 of flange 12. When in this position the case 16 and flange 12 operate together as a unit and the gearing is locked. The spindle then rotates at the speed of the driving element 7.

The driving element has a double flanged pulley for V belt 50 with one stationary flange 51 and the other flange 52 held resiliently toward the stationary flange by springs 53. Variation of the tension of the belt will alter the effective radial riding position of belt 50 and thus vary its effective diameter. Its resultant driven speed will vary accordingly.

In order to adequately oil the various gears above described, I provide an annular oil groove 60 formed in the lower face of driving element 7. Casing 16 is sealed at the bottom by sealed ball bearing 62 and around its upper rim by a ring 63 of soft rubber like material set into an annular groove in the upper edge of the casing and having an inwardly extending lip 61 adapted to engage against the outer face of ring 66 on the lower face of driving element 7. Arcuate slots 64 cut through plate 12 near its hub have end walls 65 slanting downwardly and outwardly in each direction. These slots enable oil forced outward and downward from the space 60, and from the space above idler gears 14, to escape upward from space 68 between the bottom of the ring gear housing and the lower face of plate 12. The rotation of this plate and its radially extending lobes forces this oil outward to the rim 17 of the housing 16. The forcing of the oil outwardly creates a zone of low pressure at the inner annuli above slots 64, and a zone of higher pressure at the peripheral area. This differential pressure forces the oil at the peripheral area downwardly and inwardly through space 68, and thence upwardly through arcuate holes 64. All the interior cup-like space of housing 16 is filled with heavy oil through filling hole 69 (Figure 6).

From the foregoing it will be seen that the spindle or shaft 2 is keyed to and driven by the sleeve 4. This sleeve may be driven either directly by the driving element 7 or indirectly through the planetary gearing composed of the sun gear 10, idler gears 14 and ring gear 17, at a reduced speed. In either case the speed of the driving element 7 may be varied by changing the tension of the V belt running over pulley 8.

The sleeve 4 is rigidly supported and journalled in the head frame of the drill press by bearings 26 and 29. The spindle may be independently journalled in such other and suitable bearings as may be necessary to maintain it in alinement.

The change from direct drive, when pin 30 engages in the notches 34 and case 16 is free to rotate can be accomplished easily by stopping the driving motor and rotating the casing to the place where pin 30 is alined with the notch of the slide fork 36. The fork is then forced inward. This causes its tines to engage over the lower pin head 39 and draw the pin downward into the hole in which it operates in the casing until it is flush with the bottom 70 of the cupped portion of the casing. At the same time the casing 16 is locked relative to the frame. A spring 71 on slide 37 engages a cavity 72 on the upper face of fork 36 to detain it in this inner position as shown in Figure 1.

When it is desired to change back to direct drive it is only necessary to withdrawn the fork to the outer position shown by dotted outline in Figure 3 where it is maintained by engagement of spring 71 in cavity 73. The pin 30 then slides upward under the urge of spring 33. In doing this it will move into any one of the notches 34. It is unnecessary to stop the drive during this change, since the speed of flange 12 is not excessive. However to cushion the shock when the upper end of pin 30 engages the notch, rubber bumpers 74 are provided on all radial faces of lobes 13. It will be observed that the pin 30 and fork 36 are proportioned and positioned so that the fork releases the pin and the case 16 is free to rotate before the pin engages the lobe notches on plate 12.

The form of drive head here illustrated and described is particularly adapted for use on drill presses, but it is at once obvious that spindle 2 can be replaced by any other shaft desired to be driven to operate other light shop machinery. In all cases a high and low speed is made available by shifting from direct to gear driven speed, and intermediate speeds are obtained by varying belt tension on pulley 8. Thus the drive head is a unit which is both compact and sturdy and is extremely easy to operate.

Whereas I have illustrated and described but one exemplary form of my device I realize that there can be many changes and substitutions of parts, none of which would alter the spirit or intendments of the invention. Therefore, I wish to be limited only by the claims.

I claim:

1. A speed change driving unit for drill presses or the like comprising a driven spindle, a driving sleeve having a flange with radially extending lobes forming detaining notches therebetween splined on said spindle, a driving element having a variable speed V belt pulley at its top and a sun gear at its bottom journalled on said sleeve above said flange, a casing having an annular rim at its top with a ring gear on the inner face thereof, journalled on said sleeve below said flange, planetary idler gears journalled on stub shafts on said flange lobes parallel to said spindle, meshing with said sun gear and said ring gear, support frame bearings journalled at each end of said spindle, one of said bearings being adjacent said casing and having a radially extending slide, a pin engaging fork having tines beveled on their bottom faces at its inner end operative in said slide, means for detaining said casing from rotation, or interlocking said casing and said sleeve, comprising a stop pin radially positioned in the lower portion of said casing operative parallel to said spindle axis and adapted to engage in said spindle flange detaining notches when in raised position, a spring urging said pin to raised position, a head on the lower end of said pin engageable by the tines of said fork whereby it may be retracted to lowered position freeing it from said flange notch and restraining said casing from rotation.

2. In a speed change head for drill presses, having a sleeve with a flange carrying idler planetary gears, a drive element having a sun gear meshing with said idler gears and a peripheral portion adapted to contact a resilient sealing ring, a casing having an upturned rim carrying a ring gear meshing with said idler gears, an oiling system including an annular oil retaining cavity formed on the bottom face of said drive element above said sun gear having a filling hole opening through the upper part of said drive element, a cup-shaped cavity formed in the upper face of said casing to receive said flange and idler gears and retain oil to immerse said gearing, a sealing bearing between said casing and said sleeve, a resilient sealing ring between the upper edge of said casing and said peripheral portion of said drive element, arcuate openings having a trapezoidal elevation formed in said flange adjacent said spindle connecting said oil retaining cavity in said casing with the area above said flange adjacent said oil retaining cavity in said driving element.

3. In a speed change head for power driven machinery including a supporting frame, having bearings journaling a sleeve, a driving element having a sun gear journaled on said sleeve, a driven spindle shaft keyed to said sleeve, a cylindrical casing journaled on said sleeve having a cup shaped recess on its upper face provided with an internal ring gear, said sleeve having a flange midpositioned relative to its length with radially extending lobes thereon and detaining notches therebetween; and planetary idler gears operative on said lobes between said sun gear and said ring gear; in combination therewith, mechanism for shifting from direct drive to planetary gear drive, including a detaining pin slidably operative in a radially positioned hole in said casing having an undercut upper head adapted to engage in said detaining notches when in raised position, rubber inserts on the contacting faces of said notches, a spring secured in said head undercut normally urging said pin upward relative to said casing and to engaging position with any one of said notches, a lower head on said pin, a radially extending slide secured to said frame, a fork bar operative therein having a fork at its inner end with tines adapted to embrace the lower end of said detaining pin and bevels on their lower faces adapted to engage the lower head of said pin, a hole formed in said slide positioned to receive the lower head of said detaining pin, and detaining means on said slide adapted to detain said slide in either an inner position with said tines engaging said detaining pin fork or an outer position with said tines retracted therefrom; said casing, detaining pin, and fork being arranged so that when said fork is moved to said inner position said tines engage the lower head of said detaining pin and force it into the hole in said slide and move said upper head from said notch engaging position.

ELSON THOMAS BARNETT.

REFERENCES CITED

The following references are of record in the file of this patent:

UNITED STATES PATENTS

| Number | Name | Date |
|---|---|---|
| 544,776 | Souder | Aug. 20, 1895 |
| 660,547 | Dyer | Oct. 23, 1900 |
| 862,861 | Barnes | Aug. 6, 1907 |
| 2,089,363 | Haas | Aug. 10, 1937 |
| 2,281,353 | Hubbard | Apr. 28, 1942 |
| 2,427,168 | Thompson | Sept. 9, 1947 |